United States Patent
Winkel et al.

(10) Patent No.: US 8,512,205 B2
(45) Date of Patent: Aug. 20, 2013

(54) METHOD FOR CONTROLLING AN AUTOMATIC TRANSMISSION OF A MOTOR VEHICLE

(75) Inventors: Matthias Winkel, Sorocaba (BR); Thomas Jager, Meckenbeuren (DE); Roland Mair, Tettnang (DE); Reiner Kneer, Nonnenhorn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 740 days.

(21) Appl. No.: 12/669,108

(22) PCT Filed: Jul. 3, 2008

(86) PCT No.: PCT/EP2008/058576
§ 371 (c)(1),
(2), (4) Date: Jan. 22, 2010

(87) PCT Pub. No.: WO2009/015980
PCT Pub. Date: Feb. 5, 2009

(65) Prior Publication Data
US 2010/0204007 A1    Aug. 12, 2010

(30) Foreign Application Priority Data
Jul. 27, 2007    (DE) .................. 10 2007 035 297

(51) Int. Cl.
*B60W 10/04*    (2006.01)
(52) U.S. Cl.
USPC .......................................... 477/115; 477/34
(58) Field of Classification Search
None
See application file for complete search history.

(56) References Cited

U.S. PATENT DOCUMENTS

| | | | | |
|---|---|---|---|---|
| 4,208,925 A * | 6/1980 | Miller et al. | ..................... | 477/63 |
| 4,829,852 A * | 5/1989 | Sakakiyama | .................. | 477/138 |
| 4,858,498 A * | 8/1989 | Bouda | ........................... | 477/137 |
| 5,050,456 A * | 9/1991 | Fukuda | ........................ | 477/115 |
| 5,605,519 A | 2/1997 | Seidel et al. | | |
| 5,680,307 A * | 10/1997 | Issa et al. | ........................ | 701/52 |
| 5,919,244 A | 7/1999 | Danz et al. | | |
| 6,030,315 A * | 2/2000 | Bellinger | ...................... | 477/121 |
| 6,035,735 A * | 3/2000 | Graf et al. | ....................... | 74/335 |
| 6,275,760 B1 * | 8/2001 | Saito et al. | ..................... | 701/55 |
| 6,363,805 B1 * | 4/2002 | Marchant | ....................... | 74/335 |
| 6,412,361 B1 * | 7/2002 | Wolf et al. | .................. | 74/336 R |
| 6,490,516 B1 * | 12/2002 | Henneken et al. | .............. | 701/51 |
| 6,519,522 B1 * | 2/2003 | Wolf et al. | ...................... | 701/61 |

(Continued)

FOREIGN PATENT DOCUMENTS

| | | |
|---|---|---|
| DE | 41 20 603 A1 | 1/1993 |
| DE | 41 30 265 A1 | 3/1993 |

(Continued)

*Primary Examiner* — David D Le
*Assistant Examiner* — Steven B Christ
(74) *Attorney, Agent, or Firm* — Davis & Bujold, PLLC

(57) ABSTRACT

A method of controlling an automatic transmission of a vehicle in which a hold gear function is activated by a driver request and is deactivated depending on a return condition. To allow an effective, safe to operate, and comfortable use, the return condition depends on one of the following criteria or a useful combination of the same: a flexible time span, consideration of the vehicle stand still time; a rotational speed of the vehicle engine, or one or several parameters which correlate with the engine rotational speed, a new, the same, or a different drive request by the driver, a change in the operating condition of the vehicle, and a plausibility check occurring during the startup procedure.

12 Claims, 1 Drawing Sheet

(56) References Cited

U.S. PATENT DOCUMENTS

| | | |
|---|---|---|
| 6,527,672 B1 | 3/2003 | Henneken et al. |
| 6,622,581 B2 * | 9/2003 | Seidel et al. ............ 74/335 |
| 6,879,900 B2 | 4/2005 | Henneken et al. |
| 6,885,929 B2 * | 4/2005 | Stragapede ............ 701/52 |
| 6,953,410 B2 * | 10/2005 | Wheeler et al. ............ 475/115 |
| 7,001,308 B2 * | 2/2006 | Henneken et al. ............ 477/121 |
| 7,066,862 B2 * | 6/2006 | Bothe et al. ............ 477/143 |
| 7,367,922 B2 * | 5/2008 | Gueter ............ 477/115 |
| 2004/0073348 A1 * | 4/2004 | Stragapede ............ 701/51 |
| 2005/0026746 A1 * | 2/2005 | Stine et al. ............ 477/34 |
| 2006/0063640 A1 * | 3/2006 | Doctrove ............ 477/34 |
| 2006/0276950 A1 * | 12/2006 | Wild et al. ............ 701/51 |
| 2007/0232441 A1 * | 10/2007 | Gueter ............ 477/34 |

FOREIGN PATENT DOCUMENTS

| | | |
|---|---|---|
| DE | 43 25 296 A1 | 2/1995 |
| DE | 197 33 464 A1 | 2/1998 |
| DE | 198 49 057 A1 | 4/2000 |
| DE | 198 49 059 A1 | 4/2000 |
| DE | 100 55 957 A1 | 5/2002 |
| EP | 0 353 310 A1 | 2/1990 |

* cited by examiner

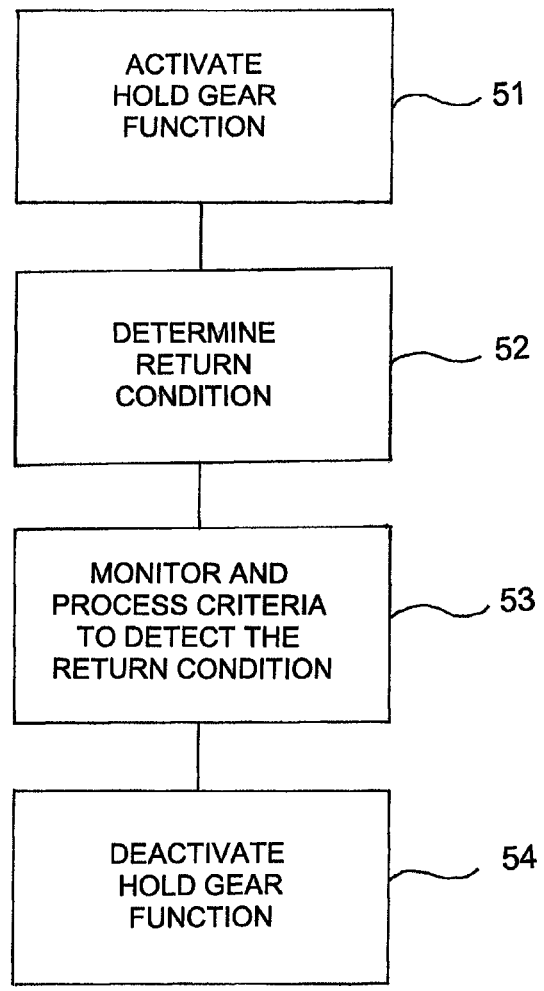

METHOD FOR CONTROLLING AN AUTOMATIC TRANSMISSION OF A MOTOR VEHICLE

This application is a National Stage completion of PCT/EP2008/058576 filed Jul. 3, 2008, which claims priority from German patent application serial no. 10 2007 035 297.4 filed Jul. 27, 2007.

FIELD OF INVENTION

The invention concerns a method for controlling an automatic transmission of a vehicle. The term automatic transmission includes all transmissions, changing automatically their gear ratio, as well as automatic shifting transmissions and continuously variable transmissions.

BACKGROUND OF THE INVENTION

The function "hold gear" with automatic transmissions in drive trains of motor vehicles is already known. Hereby, when in automatic transmission mode, an actually intended gear change is prevented and a currently used gear, or selected gear, respectively, will be maintained. To meet a driver's intended selection, the function can be activated, in principle, through a control device and analysis algorithms, either automatically or manually through a direct request from the driver.

Known control systems with automatic activation of the function use the temporary retention of a gear as part of the transmission control program, for example, to arrange for an individual style of driving, like a mainly sporty or mainly economical driving style. DE 197 33 464 B4 and DE 43 25 296 A1 can be mentioned as examples. Hereby, the function "hold gear" will automatically be activated or deactivated. Although these methods can recognize a driver specific handling, they are, however, limited in reacting to changing drive situations and in anticipating the driver's observations while driving, and to initiate, based on a current situation, the function "hold gear".

In the function "hold gear", requested and initiated by the driver, below used as term "Hold Current Gear" or simply as hold gear function, the driver is given the option, to stop directly automatically initiated or computed gear shifting by the transmission control, meaning to keep a currently selected gear, as opposed to change the gear, as arranged by the transmission control.

The background here is that, due to the driver's observations, knowledge of specific road conditions or other secondary factors can be obtained, which would not require a gear shifting, or which might be disadvantageous to the actual operating condition, respectively. It can happen, for example, when going uphill, downhill, during stop and go traffic, in rough terrain, or when maneuvering.

The driver can usually signal the request "hold current gear" to the transmission control, in the typical manner through an operator's control element. Control elements, which display the particular gear condition directly through, for example, a snap-in key at the drive switch, or indirectly through a display, the function can remain active as long as the vehicle, or the drive train respectively, work within an allowed operating range, or what the control element displays, respectively. It is then up to the driver, by activating the switch, to terminate the function at a given time. With switches, which activate the hold gear function but do not explicitly display the function, for example a non snap-in key switch, an obligatory feedback operation is provided in the transmission control, through which the hold gear function is terminated.

In most cases, it will be bothersome to the driver to deactivate the selected function through the operator's control element, after the reason for the selection of an activation disappears, at the latest after a request through a display when changing the gear's allowed range, and again the need for the activation of the control key, or to unlock the snap-in key, respectively. It addition, this might be unnecessarily distractive in regard to the actual driving situation. In other situations, it might be absolutely necessary to have the transmission control to intervene and to terminate the hold gear function, to guarantee a regular drive condition, or to exclude an excessive wear, or in the extreme to avoid damage to the transmission, or other damage to the drive train, respectively. Therefore and in principle, it is more comfortable and suitable to provide a feedback operation, when terminating a hold gear condition and returning to the automatic transmission mode of the transmission control software.

It is known to prearrange the return to the automatic drive operation, chronologically after passing a fixed time span. This very simple criterion does not always make sense or is sufficient, since the request to return to the automatic drive condition can already be made, for instance, when the vehicle is standing still and while waiting a certain time period for starting the vehicle. Examples here are the stop at a traffic light or an intersection, or the boarding or release of passengers at a bus stop. In these cases, the time limitation of the function would at least partially pass, or going nowhere, respectively, without the vehicle being in the particular and expected drive situation, which was initiated by the hold gear request. Such a situation, where the hold gear request was performed, can be, as an example, an uphill slope lying ahead. A similar situation would occur during a stop-and-go drive at a slope; the function could be terminated before the slope would have been passed. Therefore, the use of a fixed time interval is rather imperfect as a return condition.

SUMMARY OF THE INVENTION

Based on this background, the invention's task is to present a method for controlling a vehicle's automatic transmission, which, upon the driver's request for a hold gear function, provides a return condition, which always allows an effective, safe to operate, a comfortable use, and termination of the hold gear function.

The invention is based on the knowledge that a transmission's control with a flexible return condition, the return from a driver's request for a hold gear mode, is largely more effective than a fixed return condition. Especially, a return condition which is adoptable to a certain operating situation or drive situation, as opposed to a return condition with a fixed time interval, the hold gear function can be maintained as long as it makes sense or it is advantageous. Compared to a manual return which can be only performed by the driver, a flexible return condition offers extended, automated termination options, and therefore a more comfortable and targeted use of the hold gear function.

Therefore, the invention concerns a method of controlling an automatic transmission of a vehicle, in which, with reference to the figure, the hold gear function is activated by a driver's request (step S1) and is deactivated, depending on the return condition.

In addition, the invention also provides that the return condition is determined (step S2) by the following criteria:

a.) A flexible time interval under consideration of the vehicle's stop times, b.) A rotational speed of a vehicle's drive motor, or one or more parameters, correlating with the engine's rotational speed, c.) A new driver's request, same or similar request, d.) A change of the vehicle's operating condition, and e.) A plausibility check with consideration of a start-up procedure.

As initially mentioned, the term automatic transmission covers all transmissions which change the gear ratio automatically, for example also variable transmissions with automatic gear changes. The hold gear function is meant as maintaining a transmission gear ratio.

The invention proposes advantageously the use of a variable return condition, which preferably is established through suitable processing and control algorithms, as part of an existing transmission control unit. Hereby, relevant sensor data are captured and also used, insofar required, and also certain criteria are monitored and processed (step S3) with the intention to accurately terminate the temporary hold gear function (step S4), if its particular request purpose has been met and/or a continuous use of the selected gear could have disadvantageous consequences. Hereby, the individual driver's request will be complied as far as possible. Below, the invention's method is further explained through preferred embodiments.

BRIEF DESCRIPTION OF THE DRAWINGS

An embodiment of the invention is described in more detail, without being restricted thereto, based on the sole figure which shows a diagrammatical representation of the method of controlling an automatic transmission of a motor vehicle according to the invention.

DETAILED DESCRIPTION OF THE PREFERRED EMBODIMENTS

According to a first preferred embodiment of the method, the time span of the hold gear function is only running when the vehicle is moving. Hereby, the previously mentioned standstill periods do not influence the function. To also cover the stop-and-go condition, it is advantageous to not only stop a timer during that time span of the hold gear function at standstill, but also to reset it (to Zero). Hereby, the predefined time span becomes an effective net time of the hold gear function when driving, followed by automatic termination of the function.

Instead of such a time criterion or, if necessary, a combination with such a time criterion, relevant drive criteria can provide an even more variable and more accurate return condition. It is especially advantageous to make use of the transmission's rotational speed, force-locked with the combustion engine, and related criteria, for the determination of the return condition.

In can therefore be provided to automatically deactivate the hold gear function, when a predetermined and drive relevant, upper threshold value is exceeded, or when a predetermined and drive relevant, falls below the lower threshold value.

Such a drive relevant threshold value can advantageously be a certain rotational speed of the combustion engine which is connected with the transmission. For example, an upper threshold value can be exceeded, if the motor's rotational speed gets close to a provided electronic power reduction limit of the motor, meaning when a power surplus is available. In the lower rotational speed range, a lower threshold value can only fall below, if the engine's rotational speed gets close to the idling rotational speed, meaning that the drive torque is not sufficient anymore to maintain the rotational speed. In these cases, it is not appropriate to keep the actual selected gear, so that the transmission, without the driver's involvement, returns to the automatic gear shift mode.

Analogously, the engine's rotational speed can also be substituted by other signals which describe the engine's rotational speed. In particular, the transmission's input rotational speed, the transmission's output rotational speed, weighted with the corresponding gear ratio of the selected gear, or the vehicle's speed, weighted with a corresponding transmission, wheel, and axle drive ratio conversion factor. From these parameters, threshold values can also derive for the return condition, as mentioned above.

The mentioned rotational speed limits or threshold values, respectively, can also be adjusted, depending on the driver's request, acknowledged and signaled as an activated throttle pedal, an activated brake pedal, or an activated, secondary brake. Hereby and in particular, the case of pull operation (driving up hill or driving on a same level, respectively) can be dealt with separately as from the case of push operation (driving or braking on a downhill slope). Thus, it is also possible to consider the intensity of the driver's request.

In addition, it is also possible that the driver terminates the hold gear function by himself. As compared to a special switch, the return operation handling offers hereby essential, extended, and more comfortable options. Therefore, it is proper to terminate the hold gear function, if a new, meaning a different request goes to the transmission, or the vehicle, respectively, issued by the driver. Such a driver's request, for example, can adjust the actual gear, like touching lightly the gear selector lever, once or repeatedly, in the plus or minus direction, to sequentially upshift or downshift the transmission. Also, an automatic mode can explicitly be requested. The driver's requirements show the transmission control directly the driver's request, which terminates still the active hold gear function, followed by the corresponding, automatic, deactivation of the hold gear function.

Another request by the driver can be submitted through changing the driving direction, for instance signaled by activation of the switch of the direction indicator, or through a steering angle sensor. Another driver's requirement can be a kick down, meaning to press the accelerator pedal down fast for activating the kick down switch, usually followed by the transmission shifting to the next lower gear position.

When renewing the request for the hold gear function, two options exist. On one hand, the transmission control can be adjusted in a way, so that a renewed driver's requirement for the hold gear function is interpreted as an immediately effective return condition.

It is also possible, in case of a renewed driver's request of hold gear, to extend the time span for the hold gear function, meaning to delay the return condition. This can be achieved by resetting the timing counter, meaning again starting the time span, or by an increase of the timing counter's time span through a predefined increment. In the last mentioned version, the driver can advantageously extend the hold gear, if it is foreseeable that the regular time span of the function is not sufficient.

Also, it may be provided to deactivate the hold gear function, if a temporary operating condition, for which the hold gear function was requested, has been completed. If the driver intends to control a temporary situation through the hold gear function, for instance no shifting when driving up hill or downhill, one can assume that, at terminating the operating condition, or change to another operating condition, respectively, the initiating situation to hold gear, therefore the driver's request, have ended.

If the hold gear function, as an example, has been activated under a pull condition, it will be terminated when a push condition arises, which can be signaled, for instance, that there is no drive pedal activation but maybe the brake activation occurs. However, if the hold gear function had been activated during the push operation, it will be terminated if pull conditions arise, for instance signaled by not having the brake activation anymore, but a drive pedal activation occurs. Thus, the hold gear function can be applied effectively and properly while driving uphill/downhill. In addition, the hold gear function is not applied unnecessarily and terminated in a comfortable manner, when changing between uphill and downhill driving, and driving level, meaning on the same plane.

Further, it is advantageous to provide, for a start-up operation, certain measures regarding the hold gear function. In particular, it can be provided to deactivate the hold gear function in a start-up situation, if the plausibility test shows that the gear actually held by the driver's request is not suitable for the start-up situation.

If the hold gear function was activated while driving and if the selected gear is not a suitable start-up gear, then, either after a stop or at stopping, respectively, and although being in the hold gear function, an automatic start-up shifting has to be performed. For example, the start-up in a fixed gear might be improper, to prevent the danger of excessive wear or even damage of the clutch, or transmission, respectively. The specified gear might be too large, so that the gear ratio completely prevents a start-up, without stalling the engine. In these cases, the transmission control initiates at least a change to a suitable start-up gear.

To the contrary, it can be provided to prioritize the actually held gear, in a start-up situation, if a plausibility check defines that this gear is suitable for the start-up procedure. Hereby and when stopping, a continued hold gear request might be sustained also during start-up. Thus, the hold gear function remains active, consequently staying in the start-up gear. All avoidable gear positions will be suppressed.

Also possible is a principle deactivation of the hold gear function, which was activated while driving, takes place as soon as the vehicle stops.

Finally, it is also possible to limit at a start-up procedure a range of the upper automatic gears to a gear, at which the hold gear function was activated. In this case, all requested gear shifts, submitted by the transmission control while in automatic mode, will be executed under the consideration of the gear limiting.

To adjust the return condition for the different operating conditions, available in a practical drive situation, in which the use of the hold gear function can be advantageous, possibly sensitive, safe to operate and comfortable, a person who is skilled in the art will combine, in a useful manner, either individually or together, the above mentioned criteria, unless they exclude one another.

The invention claimed is:

1. A method of controlling an automatic transmission of a vehicle, in which a hold gear function is activated by a request from a driver and deactivated depending on a return condition, the method comprising the steps of:
    activating the gear hold function with a transmission control unit, to prevent a gear shift, when the driver signals the request for the hold gear function;
    establishing, with the transmission control unit, the return condition based on:
        a flexible time span which is measured by a timer, the time span is extendable by an amount of time that the vehicle is at a stand still; and at least one of:
        either a rotational speed of an engine of the vehicle or at least one parameter correlated with the rotational speed of the engine;
        one of a new drive request, a same drive request, or a different drive request by the driver;
        a change in operating condition of the vehicle; and
        a plausibility check under consideration of a startup procedure;
    deactivating the hold gear function when the return condition is recognized by the transmission control unit.

2. The method according to claim 1, further comprising the step of starting the timer upon activation of the hold gear function and deactivating the hold gear function after expiration of the flexible time span, and stopping the timer during each stand still of the vehicle.

3. The method according to claim 2, further comprising the step of resetting the timer to zero at each stand still of the vehicle.

4. The method according to claim 1, further comprising the step of deactivating the hold gear function if a renewed driver request for the hold gear function is registered.

5. The method according to claim 1, further comprising the step of extending the time span for the hold gear function if a renewed request from the driver for the hold gear function is registered.

6. The method according to claim 5, further comprising the step of resetting the timer upon the renewed request from the driver for the hold gear function.

7. The method according to claim 5, further comprising the step of increasing the time span of the timer by a predetermined increment upon the renewed request from the driver for the hold gear function.

8. The method according to claim 1, further comprising the step of deactivating the hold gear function, during the start up procedure, if the plausibility check determines a currently engaged gear, by a request of the driver, is not suitable for the start up procedure.

9. The method according to claim 1, further comprising the step of prioritizing a currently engaged gear as requested by the driver, during the start up procedure, if the plausibility check determines that the currently engaged gear is suitable for the start up procedure.

10. The method according to claim 1, further comprising the step of limiting a range of automatically shifted gears, during the start up procedure, by a top gear at which the hold gear function had been activated.

11. A method of controlling an automatic transmission of a vehicle in which a hold gear function is activated by a request of a driver and the hold gear function is deactivated depending on a return condition, the method comprising the step of:
    activating the hold gear function by a transmission control unit to restrict automatic shifts of transmission gear ratios;
    starting a timer when activating the hold gear function to determine a time span of which both the hold gear function is active and the vehicle is moving;
    stopping the timer when the vehicle is at a stand still and running the timer when the vehicle is moving to determine a total time span of which both the hold gear function is active and the vehicle is moving;
    defining, with the transmission control unit an upper and a lower speed threshold value of at least one of an engine rotational speed, a transmission input rotational speed, a transmission output rotational speed and a vehicle drive speed;

monitoring a value of the at least one of the engine rotational speed, the transmission input rotational speed, the transmission output rotational speed and the vehicle drive speed;

deactivating the hold gear function with the transmission control unit based on the total time span of which both the hold gear function is active and the vehicle is moving and if, under consideration of the request of the driver, the value of the at least one of the engine rotational speed, the transmission input rotational speed, the transmission output rotational speed and the vehicle drive speed either exceeds the respective upper speed threshold value or falls below the respective lower speed threshold value.

12. The method according to claim 11, further comprising the step of interpreting at least one of an activated drive pedal, an activated brake pedal and an activated secondary brake system as the request of the driver.

* * * * *